J. Williams,
Grinding and Smoothing Shot and Shell.
N° 40,386. Patented Oct. 20, 1863.
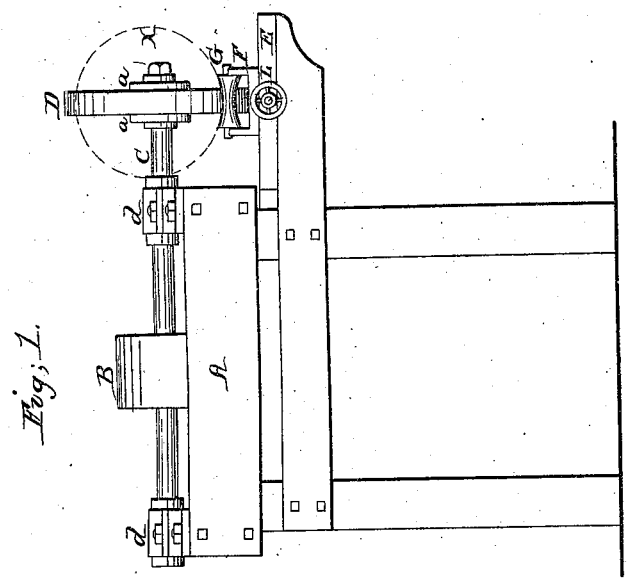
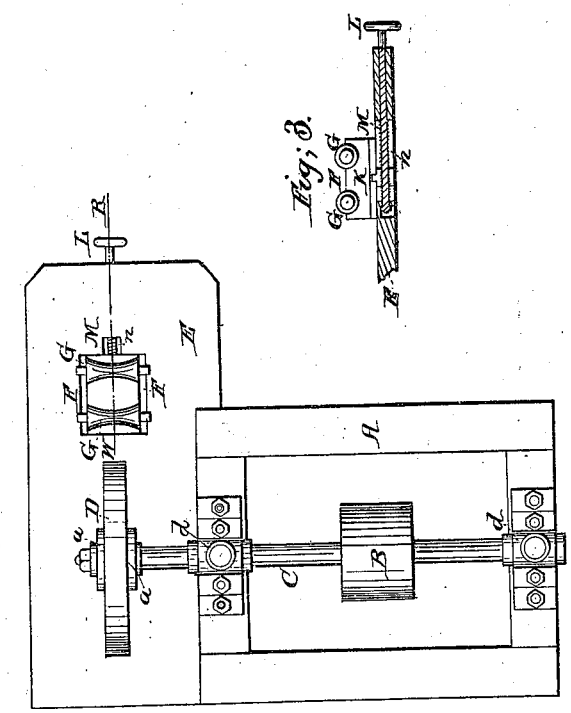

UNITED STATES PATENT OFFICE.

JARVIS WILLIAMS, OF BOSTON, MASSACHUSETTS, ASSIGNOR TO EDWARD T. TROFITTER, OF SAME PLACE.

IMPROVEMENT IN GRINDING AND SMOOTHING SHOT AND SHELL.

Specification forming part of Letters Patent No. 40,386, dated October 20, 1863.

*To all whom it may concern:*

Be it known that I, JARVIS WILLIAMS, of Boston, in the county of Suffolk and State of Massachusetts, have invented a new and useful Machine for Grinding and Smoothing Shot, Shell, &c.; and I do hereby declare that the following is a full, clear, and exact description of the construction and operation of the same, reference being had to the accompanying drawings, forming a part of this specification, in which—

Figure 1 is a side elevation; Fig. 2, a plan; and Fig. 3, a vertical section through the adjustable carriage and its appendages in line W R, Fig. 2.

Like parts are indicated by the same letters in all the drawings.

Shot and shell have hitherto been "trued" and smoothed by hand with chisels and files or turned in a lathe, both of which methods are comparatively slow and expensive.

The nature of my invention therefore consists, first, in the employment of an adjustable sliding carriage provided with a pair of concave rollers, forming for the spherical body a concave seat, on which it can be turned in any direction and adjusted, to operate in combination with any suitable grinding or polishing wheel; second, in constructing each of the rollers of said adjustable carriage in two parts capable of moving in opposite directions, to facilitate the turning of heavy spherical bodies horizontally.

To enable others skilled in the art to make and use my invention, I will now proceed to describe its construction and operation.

A is a stand or frame, of any convenient height.

C is a shaft, which turns in the boxes $d\ d$ on the top of either end of the frame, as shown in Figs. 1 and 2.

B is a pulley, by means of which the shaft C is made to rotate with great rapidity.

D is the grinding or polishing wheel attached to the projecting end of the shaft C, and confined by the set-screws $a\ a$, as shown in Figs. 1 and 2. This wheel D may be of any material in general use for grinding and polishing; but what is known as "emery vulcanite" I consider as best adapted to the purpose.

E is a table resting on arms projecting from the frame, as shown in Fig. 1, and through this table, at a right angle with the shaft C, is a slot, $n$, as represented in Figs. 2 and 3, to receive the sliding block K, attached to the bottom of the adjustable roller-frame F, as seen in Fig. 3.

M is a screw entering the end of the table E, passing through the slot $n$ and block K, the latter being provided with a female screw to receive it. The screw M is prevented from advancing by means of a head or shoulder in the usual manner.

L is a wheel fast to the outer end of the screw M, by means of which the latter is turned by the operator when it is required to carry the roller-frame F toward or from the polishing-wheel D.

The frame F may be made of wood or metal, and is provided with concave rollers G, which turn freely on suitable axles, as shown in the drawings. Rollers thus constructed and arranged form a concave seat for a shot, shell, or other spherical body, (represented by the dotted line X in Fig. 1,) keeping it from rolling off, and allowing it to be readily turned, so as to bring any part of its surface in contact with the wheel D.

To render it easier to turn a very heavy spherical body horizontally, I divide the roller G at its center, making in effect two rollers capable of moving in opposite directions.

A shot, shell, or other spherical body being placed upon the rollers, the operator readily adjusts it to the proper distance from the wheel D by means of the wheel L, and in this position it may be turned in any direction by hand until the grinding or polishing wheel has rendered it sufficiently true and smooth.

As compared with the usual method of truing and smoothing shot and shell, my improvement performs the work required with great rapidity, effecting a very important saving of labor and tools, such as files and chisels, one man with my machine accomplishing as much as five or more without it, and in the usual manner.

It is also obvious that my machine may be used to advantage in grinding and smoothing cylinders and cones, as well as spheres.

Having thus described the construction and arrangement of my improvements, what I claim as new, and desire to secure by Letters Patent, is—

1. The adjustable frame F, provided with the concave rollers G G, in combination with any suitable grinding or polishing wheel, D, substantially as set forth, and for the purpose described.

2. Making the rollers G in two parts, capable of turning in opposite directions, substantially as and for the purpose described.

JARVIS WILLIAMS.

Witnesses:
   N. AMES,
   E. T. TROFITTER.